United States Patent
Yamane et al.

(10) Patent No.: US 7,799,837 B2
(45) Date of Patent: Sep. 21, 2010

(54) BOTTLE EXCELLENT IN RECYCLABILITY AND METHOD FOR RECYCLING THE BOTTLE

(75) Inventors: Kazuyuki Yamane, Fukushima-Ken (JP); Ryo Kato, Fukushima-Ken (JP); Hiroyuki Sato, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 12/232,365

(22) Filed: Sep. 16, 2008

(65) Prior Publication Data
US 2009/0030094 A1     Jan. 29, 2009

Related U.S. Application Data

(62) Division of application No. 10/514,048, filed as application No. PCT/JP03/06134 on May 16, 2003.

(30) Foreign Application Priority Data
May 21, 2002    (JP)    ............... 2002-146095

(51) Int. Cl.
*C08J 11/16*    (2006.01)
(52) U.S. Cl. .................... 521/40; 562/483; 562/486
(58) Field of Classification Search .......... 562/483, 562/486; 521/40
See application file for complete search history.

(56) References Cited

U.S. PATENT DOCUMENTS

| | | | |
|---|---|---|---|
| 6,031,128 A * | 2/2000 | Roh et al. | .................. 562/483 |
| 6,245,437 B1 | 6/2001 | Shiiki et al. | |
| 6,500,915 B1 | 12/2002 | Fujimori et al. | |
| 6,649,792 B2 * | 11/2003 | Sirek et al. | .................. 562/483 |
| 6,673,403 B1 * | 1/2004 | Shiiki et al. | ............... 428/35.7 |
| 6,673,463 B1 | 1/2004 | Onishi et al. | |
| 2002/0186120 A1 | 12/2002 | Tamura et al. | |
| 2003/0082322 A1 | 5/2003 | Suzuki et al. | |

FOREIGN PATENT DOCUMENTS

| | | |
|---|---|---|
| CN | 1228736 | 9/1999 |
| EP | 0 790 278 | 8/1997 |
| EP | 0 925 915 | 6/1999 |
| JP | 08-104797 | 4/1996 |
| JP | 10-138371 | 5/1998 |
| JP | 10-337772 | 12/1998 |
| JP | 2000-94547 | 4/2000 |
| JP | 2003-136657 | 5/2003 |
| WO | 98/10932 | 3/1998 |

OTHER PUBLICATIONS

European Office Action issued Nov. 23, 2007 in the corresponding European application.

* cited by examiner

*Primary Examiner*—Robert D. Harlan
(74) *Attorney, Agent, or Firm*—Wenderoth, Lind & Ponack, L.L.P.

(57) ABSTRACT

There are provided a bottle which has a laminate structure including a glycolic acid polymer layer showing good gas-barrier property in addition to a principal resin layer and is yet provided with excellent recyclability, and also an efficient method of recycling the bottle. More specifically, a bottle having a laminate structure including at least one layer of glycolic acid polymer in addition to a principal resin layer, is obtained. After breaking the bottle, the broken pieces are washed with alkaline water, water or acidic water to remove the glycolic acid polymer layer, thereby recovering the principal resin.

6 Claims, No Drawings

BOTTLE EXCELLENT IN RECYCLABILITY AND METHOD FOR RECYCLING THE BOTTLE

This application is a divisional of Ser. No. 10/514,048, filed Nov. 10, 2004, which is a U.S. National Stage of International Application PCT/JP03/06134, filed May 16, 2003.

TECHNICAL FIELD

The present invention relates to a bottle with excellent recyclability comprising a glycolic acid polymer layer in addition to a principal resin layer and also to a recycling method therefor. Herein, the term "bottle" refers not only to a bottle in its narrow or ordinary sense having a small size of mouth or neck relative to its internal volume but also refers to a (hollow) shaped container in general for containing contents material therein. It is believed readily understandable from the following description that the effect of the present invention is not restricted by a strict shape of containers.

BACKGROUND ART

Resin-made bottles are used widely and in large masses as containers for various liquid materials, such as drinking water, seasonings, edible oil, alcoholic beverages, fuels, and detergents, because of their lightness, transparency allowing seeing therethrough of the content materials, etc. This particularly holds true with so-called "PET bottles", made of polyester resins, especially bottles made of PET (polyethylene terephthalate).

However, in view of town problems nowadays including the demands for reducing the load to the environment and reducing the garbage, the recycling of such resin-made bottles used in large masses have been demanded. As for the manner of recycling, various types are present, including a heat energy recovery type through combustion, a chemical recycle type of recycling to monomers, a starting material type of recycling to a starting resin material through pulverization and refining steps, and a returnable type for re-utilization as bottles. In the case of PET bottles among other, the starting material-type of recycling to the starting resin material through pulverization and refining steps is frequently adopted, and the recovered resin material is re-utilized for producing fiber products, etc., in many cases.

On the other hand, nowadays, also bottles are required to suppress the transmission therethrough of carbon dioxide gas or oxygen gas for improving the preservability of contents therein. For achieving the improvement, there has been proposed, e.g., a multiple layer structure of providing a gas barrier coating or disposing a gas barrier resin layer as an intermediate layer.

In the case of a PET bottle provided with a multiple layer structure by disposing a gas barrier coating or an intermediate gas barrier resin layer, it is possible that the quality or safety of the recycled resin materials is questioned if it is difficult to sufficiently separate the PET resin material and other resin materials.

Further, it has been also tried to use colored PET bottles in order to prevent photodegradation of contents, such as beer, or achieve a design effect, but the utilization thereof has been restricted because it is liable to make difficult the recycling due to the problem of color mixing of the recycled resins.

DISCLOSURE OF INVENTION

An object of the present invention is to provide a bottle which has a laminate structure including an additional resin layer in addition to a principal resin layer and is yet provided with excellent recyclability, and also an efficient method of recycling the bottle.

According to our study, it has been found very effective for achieving the above object to dispose a glycolic acid polymer layer as an additional resin layer.

Thus, the bottle excellent in recyclability according to the present invention is characterized by having a laminate structure including at least one layer of glycolic acid polymer in addition to a principal resin layer.

Further, the bottle recycling method according to the present invention is characterized by comprising the steps of: breaking a bottle having a laminate structure including at least one layer of glycolic acid polymer in addition to a principal resin layer, and washing broken pieces of the bottle with alkaline water, water or acidic water to remove the glycolic acid polymer layer, thereby recovering the principal resin.

Reasons why the glycolic acid polymer is particularly excellent as a resin constituting an additional resin layer of a bottle to be recycled are as follows. Glycolic acid polymer has an extremely high gas-barrier property as high as ca. 3 times or higher (i.e., ca. ⅓ or lower in terms of an oxygen transmission coefficient) as that of EVOH (ethylene-vinyl alcohol copolymer) which is a representative gas-barrier resin used heretofore, so that a bottle with a remarkably improved gas-barrier property can be obtained by including a thin layer thereof in addition to the principal resin layer. Accordingly, it becomes possible to effectively prevent the degradation of contents due to oxidation or poorer quality due to dissipation of carbon dioxide gas. Further, in the material-type recycling adopted for PET bottles, etc., there has been generally adopted a method of recovering the material resin through steps of breaking bottles and, then subjecting the broken bottle pieces to alkali washing for the purpose of decomposing protein, etc. In this instance, glycolic acid polymer used in the present invention has a substantial hydrolyzability with alkaline washing liquid, water (particularly, warmed water) or acid water, so that it can be easily separated by washing from the principal resin material to be recovered. Further, glycolic acid formed by hydrolyzation of the glycolic acid polymer in the washing waste liquid can be biologically decomposed into carbon dioxide gas and water by subjecting the washing waste liquid to neutralization and treatment with activated sludge, thus being obviated from functioning as a load to the environment. In contrast thereto, polylactic acid-based polymer which is a conventionally known representative biodegradable resin does not exhibit gas-barrier property like that of glycolic acid polymer, and can only show a slower hydrolyzation speed with alkaline water, water or acidic water.

EMBODIMENTS OF THE INVENTION (Glycolic Acid Polymer)

Glycolic acid polymer is a hydrolyzable polyester having a recurring unit represented by a formula (1) below:

—(OCH$_2$CO)—     (1)

It is preferred to use glycolic acid homopolymer (PGA) consisting only of the above recurring unit, but another recurring unit can be contained provided that a structure having a main chain which can be cut by hydrolysis is preferred. Preferable structures may include ester structures including carboxylic acid esters and carbonic acid esters, and amide structure. Particularly, an aliphatic ester structure is preferred because of easiness of hydrolysis. Examples thereof may include the following:

$$—(OCHCH_3CO)— \quad (2)$$

$$—(OCH_2CH_2CH_2OCO)— \quad (3)$$

$$—(OCH_2CH_2CH_2CH_2CO)— \quad (4)$$

The proportion of such another recurring unit structure is below 50 wt. %, preferably below 30 wt. %, further preferably below 15 wt. %. To the glycolic acid polymer, it is possible to incorporate a thermal stabilizer, a plasticizer, etc., as may be required for melt-processing, and further a colorant, such as a pigment, within an extent not adverse to the object of the present invention.

(Principal Resin)

As a principal resin forming the bottle together with a layer of the glycolic acid polymer, various species and grades of thermoplastic resins may be used, inclusive of polyesters as represented by PET (i.e., polyethylene terephthalate) and polyethylene naphthalate (PEN); polyvinyl chloride (PVC), polyethylene (PE), polypropylene (PP), polycarbonate (PC), polystyrene (PS) and polylactic acid (PLA). As already mentioned before, glycolic acid polymer has a remarkably higher gas-barrier property than these general-purpose resins, and can form a bottle with an improved gas-barrier property in case of being laminated with any of these resins. Particularly, in view of the fact that PET bottles are dominantly used at present, it is preferred to use PET as a principal resin for the bottle from the view point of economy and also energy consumption for the recovery and recycling. It is preferred to use PET having an inherent viscosity in the range of 0.5-1.5 dl/g, particularly 0.6-1.2 dl/g.

It is possible to use a plurality of resins in mixture but this is liable to cause a lowering in quality when recycled, so that a single resin material is preferred. It is also possible to use a colored resin but this is liable to cause a lowering in quality due to color mixing when recycled, so that a neat resin is preferred.

It is possible that a small amount of glycolic acid polymer is contained in the principal resin layer, but the content thereof should preferably be at most 10 wt. %, further preferably at most 3 wt. %, most preferably at most 1 wt. %. Such a principal resin layer containing glycolic acid polymer is generally found in the case where the principal resin layer is formed of a recycled resin layer comprising the principal resin and glycolic acid polymer, etc. Accordingly, in this case, the amount of the glycolic acid polymer can depend on the level of gas-barrier property required of the bottle of the present invention. If a resin material substantially free from glycolic acid polymer is desired to be recovered, it is preferred to use a principal resin free from glycolic acid polymer.

(Laminate Structure)

The glycolic acid polymer layer is preferably formed as an intermediate layer sandwiched between an outer layer and an inner layer composed as principal resin layers forming the bottle. The intermediate layer may be formed in a single layer or plural layers. The formation ratio between the inner and outer layer resin and the glycolic acid polymer may be arbitrarily determined depending on a performance and a quality desired of the bottle. In order to provide a good recycle efficiency of the principal resin while imparting a good gas-barrier property, the weight ratio (substantially corresponding to a layer thickness ratio) between the principal resin and the glycolic acid polymer is preferably in the range of 99/1-55/45, particularly 98/2-80/20. Incidentally, it is preferred that the glycolic acid polymer layer is formed in a thickness of at least 3 μm so as to exhibit a good gas-barrier property. The thickness should preferably be retained in the body or trunk portion which occupies a major area of a bottle and, in some cases, the glycolic acid polymer layer can be not present at the bottom or neck portion. Further, in some cases, it is possible to include a recovery resin layer comprising a mixture of the principal resin and the glycolic acid polymer and in such a case, the content of glycolic acid polymer in the recovery resin layer should preferably be at most 50 wt. %, further preferably at most 30 wt. %, most preferably at most 10 wt. %. If it is desired to recover a resin material substantially free from glycolic acid polymer, it is preferred that the recovered resin layer does not contain glycolic acid polymer. Incidentally, examples of the laminate layer structure in the case of including a recovery resin layer may include: principal resin/recovery resin/glycolic acid polymer/principal resin, principal resin/glycolic acid polymer/recovery resin, etc.

It is possible to insert an adhesive resin, as desired, e.g., between the principal resin layer and the glycolic acid polymer layer, but it is preferred not to insert such a layer if it obstructs the recyclability.

(Recycling Method)

Bottle recycling has been actually performed with respect to PET bottles. In such a system, after washing and selective removal of other resin items (such as caps and PVC-made bottles), PET bottles are broken or cut, washed with alkaline water and recovered as PET resin.

It is preferred that also the bottles of the present invention are recycled through recycling steps similar to those in the above-mentioned PET bottle recycling system. The separation of glycolic acid polymer can also be made by utilizing a difference in specific gravity, but the utilization of washing with alkaline water, water or acid is more efficient and reliable. The alkaline water washing may be performed, e.g., by using 0.01-5 normal of alkaline water washing liquid at 20-100° C., preferably 40-98° C., for 5 min.-10 hours, and can efficiently hydrolyze the glycolic acid polymer in a short time into glycolic acid. The water washing may be performed by using water at an elevated temperature of at least 40° C. (and optionally under pressure) so as to accelerate the hydrolysis. It is also possible to use steam as at least a portion of water and also as heat source. Acidic water also has an effect of accelerating the glycolic acid polymer similarly as alkaline water and is used at 20-100° C., preferably 40-98° C. As the acid, glycolic acid per se is preferred. The washing may be performed at one time or plural times. Incidentally, the adhesion strength between a glycolic acid polymer layer and a PET layer is not so strong, and partial peeling therebetween may frequently occur during the bottle breaking step. This is also a factor of accelerating the removal by dissolution of the glycolic acid polymer during the washing with alkaline water, water or acidic water.

(Waste Liquid Disposal)

The washing waste liquid formed by washing with alkaline water, etc., containing glycolic acid resulting from hydrolysis of the glycolic acid polymer can possibly be discharged as it is after neutralization as glycolic acid is an organic acid occurring in nature but may preferably be subjected to activated sludge treatment to biologically decompose glycolic acid into $H_2O$ and $CO_2$, thereby alleviating the load to the ecological system. The activated sludge treatment is a step also contained in the conventional PET bottle recycling system, and the bottle recycling method according to the present invention can be practiced without new equipment investment and only with a slight increase in the load of the activated sludge treatment.

As an embodiment of the washing with water or acidic water, the aqueous washing liquid containing glycolic acid produced by hydrolysis may be recycled to be used as washing water having an effect of accelerating hydrolysis of the glycolic acid polymer to form a condensed glycolic acid aqueous solution (of which the concentration is suitably at most 70%), which is then further condensed and polycondensed to be recovered as glycolic acid oligomer. The glycolic acid oligomer may be converted into glycolide (cyclic dimer ester of glycolic acid) useful as a starting material for polyglycolic according to a process disclosed in International Publication WO-A 02/14303. More specifically, the process of WO-A 02/14303 allows a process including the steps of:

(I) heating a mixture including glycolic acid oligomer (A) recovered in the above-described manner and a polyalkylene glycol ether (B) represented by a formula (I) below:

(wherein $R^1$ denotes a methylene group or a linear or branched alkylene group having 2-8 carbon atoms, $X^1$ denotes a hydrocarbon group, Y denotes an alkyl or aryl group having 2-20 carbon atoms, and p denotes an integer of at least 1 with the proviso that in case of p is 2 or more, plural $R^1$ can be the same of different), and having a boiling point of 230-450° C. and a molecular weight of 150-450, to a temperature (e.g., 200-320° C.) causing depolymerization of the glycolic acid oligomer (A) under normal pressure or a reduced pressure of 0.1-90 kPa;

(II) forming a solution state where a molten liquid phase of the glycolic acid oligomer (A) and a liquid phase of the polyalkylene glycol ether (B) form a uniform phase, (III) continuing the heating in the solution state to distill off glycolide (cyclic ester) formed by the decomposition together with the polyalkylene glycol ether (B); and (IV) recovering the glycolide from the distillate. By converting the thus-recovered glycolide into a glycolic acid polymer to form the bottle of the present invention, it becomes possible to recycle also the glycolic acid polymer.

(Coloring)

As a preferred embodiment of the present invention, it is preferred that the glycolic acid polymer layer is colored. In this case, a colored bottle is obtained and can suppress photodegradation, etc., of the content material by controlling the transmission of light rays. The glycolic acid polymer layer may be uniformly colored but an arbitrary pattern of colored layer can be disposed thereover to provide an increased aesthetic design effect. The colorant may be selected from any known ones to develop a desired color but, in view of load to the environment after the recycling, it is preferred to use a biodegradable dye or pigment, e.g., edible red dye for coloring in red.

Another advantage accompanying the coloring of the glycolic acid polymer layer is that it allows the determination of the condition, such as the number and time, of washing for the recycling through eye observation. More specifically, the remaining of glycolic acid polymer results in the remaining of solid colored resin, thus allowing easy judgment of incomplete separation of the glycolic acid polymer. As a result, the quality control of the recovered principal resin after the recycling can be remarkably simplified.

The production of a colored bottle with a colored intermediate layer may be applied to intermediate layer resins other than glycolic acid polymer, but this is not practical since it does not provide a sufficient function (such as gas-barrier property) other than an improved design effect by the coloring. Particularly, the presence of a colored resin layer has made difficult the separation of the resins for the recycling to provide an obstacle factor in the recycling, but this is utterly contrary in case of the bottom of the present invention.

EXAMPLES

Hereinbelow, the present invention will be described more specifically based on Examples and Comparative Example, wherein "part(s)" represents "part(s) by weight".

Example 1

PET (I.V.=0.8) and PGA (melt viscosity=1500 Pa·s at 240° C. and 100/s) were fed separately to an injection molding machine equipped with two cylinders to form a preform with three layers of PET/PGA/PET (thickness ratios=45/10/45), which was then formed into a bottle (inner volume=500 cc, thickness=800 μm, weight=40 g) by means of a blow molding machine.

The thus-formed bottle was cut into 2 cm-square pieces and washed for 5 hours in a 1 normal-caustic soda aqueous solution at 80° C. The washed pieces were filtered out, washed with water and dried to obtain 36 g of recovered resin. The thus-recovered resin was analyzed with respect to infrared absorption spectrum whereby absorption peaks attributable to only PET were observed, thereby confirming complete removal of PGA.

Example 2

A bottle was prepared in the same manner as in Example 1 except that PGA colored with 0.1 part of carbon black per 100 wt. parts thereof was used.

The thus-formed bottle were cut into 2 cm-square pieces and washed for 5 hours in a 1 normal-caustic soda aqueous solution at 80° C. The washed pieces were filtered out, washed with water and dried to obtain colorless recovered resin. The thus-recovered resin was analyzed with respect to infrared absorption spectrum whereby absorption peaks attributable to only PET were observed, thereby confirming complete removal of carbon black and PGA.

Example 3

A bottle prepared in the same manner as in Example 2 was cut into 2 cm-square pieces, which were then washed for 3 min. in a 1 normal-caustic soda aqueous solution at 80° C. The washed pieces were filtered out but some black-colored solid remained on the pieces. Then, the pieces were again washed for further 3 hours in a 1 normal-caustic soda aqueous solution at 80° C. The pieces thus washed again was analyzed with respect to infrared absorption spectrum whereby absorption peaks attributable to only PET were observed, thereby confirming complete removal of carbon black and PGA.

Example 4

The PET resin recovered in Example 2 was melt-pressed at 270° C. and cooled by a cooling press at room temperature to obtain a colorless transparent PET sheet. As a result, it was confirmed that the recovered resin was formable and the principal resin PET could be recycled.

Example 5

The alkaline aqueous solution after the washing in Example 1 was analyzed by liquid chromatography, whereby glycolic acid was detected. The solution was neutralized, diluted with 100 times of water and fed to activated sludge matured by aeration, followed by culturing in an aerobic environment at room temperature for 1 month. After the one month, the reaction liquid was again analyzed by liquid chromatography, whereby no glycolic acid was detected at all. The reaction liquid was further analyzed with respect to dissolved organic carbon by a total organic carbon meter ("TOC-5000A", made by Shimadzu Seisakusho K.K.), whereby no organic carbon was detected, and the reaction liquid was discharged as it was.

INDUSTRIAL APPLICABILITY

As described above, according to the present invention, there are provided a bottle which has a laminate structure including a glycolic acid polymer layer showing good gas-barrier property in addition to a principal resin layer and is yet provided with excellent recyclability, and also an efficient method of recycling the bottle.

The invention claimed is:

1. A bottle recycling method, comprising the steps of: breaking a bottle having a laminate structure including at least one layer of glycolic acid polymer in addition to a principal resin layer, and washing broken pieces of the bottle with alkaline water, water or acidic water to substantially remove the glycolic acid polymer layer, from the principal resin layer, thereby recovering the principal resin.

2. A recycling method according to claim 1, wherein the broken pieces are washed with alkaline water.

3. A recycling method according to claim 1, wherein the glycolic acid polymer layer is colored, and the washing step is terminated by confirming the removal of the color from the broken pieces.

4. A recycling method according to claim 1, further including steps of neutralizing a waste liquid from the washing step and then biologically decomposing the waste liquid with activated sludge.

5. A recycling method according to claim 2, wherein the glycolic acid polymer layer is colored, and the washing step is terminated by confirming the removal of the color from the broken pieces.

6. A recycling method according to claim 2, further including steps of neutralizing a waste liquid from the washing step and then biologically decomposing the waste liquid with activated sludge.

* * * * *